US007493054B2

(12) United States Patent
Ujigawa

(10) Patent No.: US 7,493,054 B2
(45) Date of Patent: Feb. 17, 2009

(54) IMAGE FORMATION DEVICE SIMULATION APPARATUS

(75) Inventor: Yasushi Ujigawa, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 206 days.

(21) Appl. No.: 11/476,703

(22) Filed: Jun. 29, 2006

(65) Prior Publication Data

US 2007/0189784 A1 Aug. 16, 2007

(30) Foreign Application Priority Data

Feb. 13, 2006 (JP) ............................ 2006-034960

(51) Int. Cl.
*G03G 15/00* (2006.01)
*G06F 17/00* (2006.01)

(52) U.S. Cl. ............................ 399/8; 358/1.15; 399/27

(58) Field of Classification Search .................... 399/8, 399/9, 24, 25, 26, 27; 358/1.15
See application file for complete search history.

(56) References Cited

U.S. PATENT DOCUMENTS 6,104,893 A 8/2000 Byeon et al.
6,717,693 B2 * 4/2004 Mitsuhashi et al. ........ 358/1.15
7,206,526 B2 * 4/2007 Kobayashi .................. 399/27
7,355,730 B2 * 4/2008 Landau et al. .............. 399/8 X
2002/0136559 A1 * 9/2002 Simpson et al. ................ 399/9
2004/0100650 A1 5/2004 Landau et al.
2006/0007509 A1 1/2006 Imagawa et al.
2006/0146365 A1 * 7/2006 Sugita ....................... 358/1.15
2006/0269303 A1 * 11/2006 Zollner et al. ................. 399/30

FOREIGN PATENT DOCUMENTS

CN 1206141 A 1/1999
CN 1719347 A 1/2006
JP 2002-287583 A 10/2002

OTHER PUBLICATIONS

Chinese Office Action dated Oct. 10, 2008 in application No. 200610167778.7.

* cited by examiner

*Primary Examiner*—Sophia S Chen
(74) *Attorney, Agent, or Firm*—Sughrue Mion, PLLC

(57) ABSTRACT

An image formation device simulation apparatus performs a simulation of processing performed by an image formation device. The simulation apparatus includes: an image formation command acquisition unit that acquires an image formation command including information of a target image to be formed by the image formation device; a simulation unit that performs a simulation of image formation processing performed by the image formation device for forming the target image on a recording medium, and generates output image data that corresponds to the target image to be formed on the recording medium, based on the image formation command; and a consumption amount calculation unit that calculates and outputs an amount of consumption of a consumable item that the image formation device predictably consumes by the image formation processing, based on the output image data.

11 Claims, 5 Drawing Sheets

FIG. 5

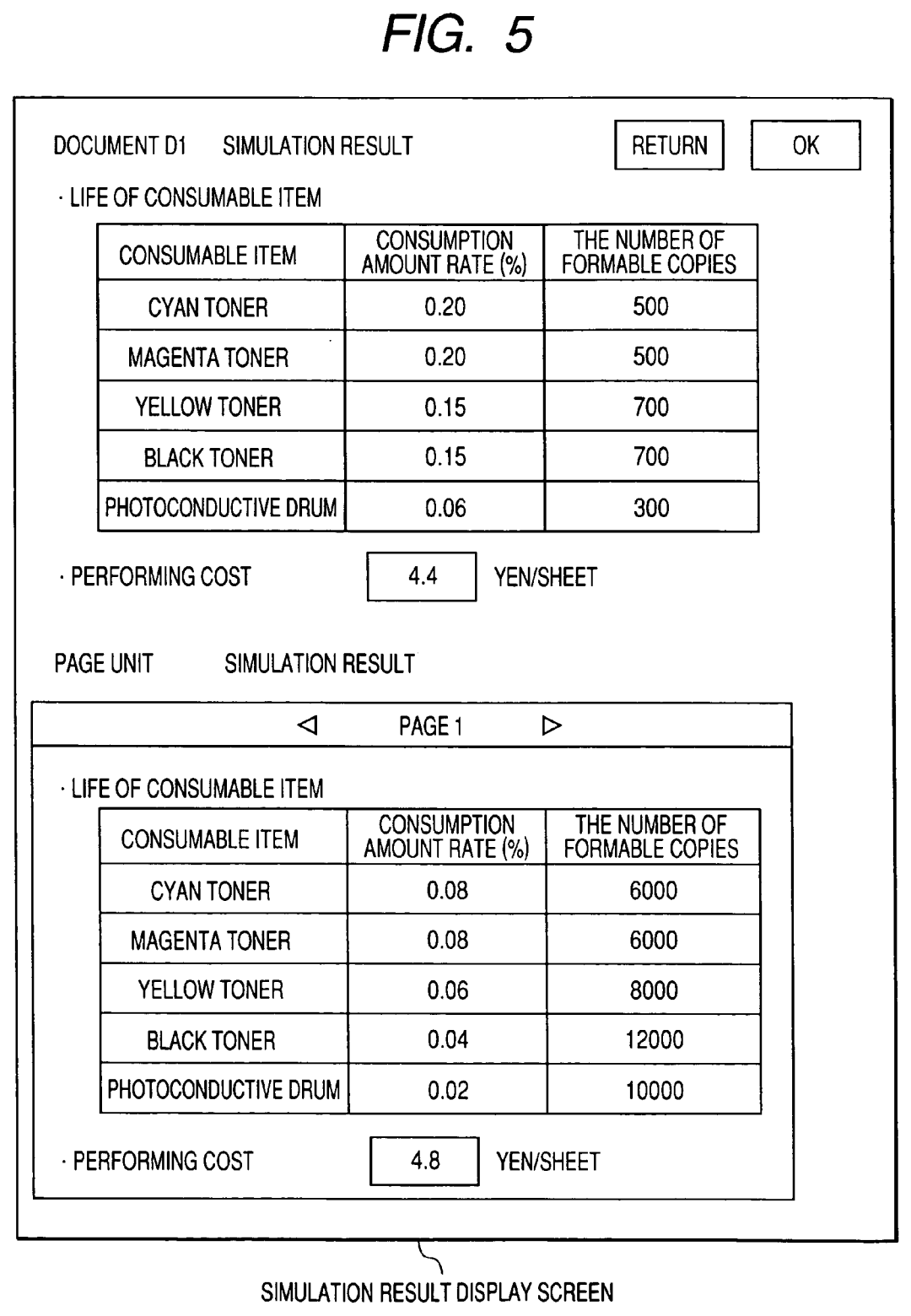

DOCUMENT D1 SIMULATION RESULT RETURN OK

· LIFE OF CONSUMABLE ITEM

| CONSUMABLE ITEM | CONSUMPTION AMOUNT RATE (%) | THE NUMBER OF FORMABLE COPIES |
|---|---|---|
| CYAN TONER | 0.20 | 500 |
| MAGENTA TONER | 0.20 | 500 |
| YELLOW TONER | 0.15 | 700 |
| BLACK TONER | 0.15 | 700 |
| PHOTOCONDUCTIVE DRUM | 0.06 | 300 |

· PERFORMING COST 4.4 YEN/SHEET

PAGE UNIT SIMULATION RESULT

◁ PAGE 1 ▷

· LIFE OF CONSUMABLE ITEM

| CONSUMABLE ITEM | CONSUMPTION AMOUNT RATE (%) | THE NUMBER OF FORMABLE COPIES |
|---|---|---|
| CYAN TONER | 0.08 | 6000 |
| MAGENTA TONER | 0.08 | 6000 |
| YELLOW TONER | 0.06 | 8000 |
| BLACK TONER | 0.04 | 12000 |
| PHOTOCONDUCTIVE DRUM | 0.02 | 10000 |

· PERFORMING COST 4.8 YEN/SHEET

SIMULATION RESULT DISPLAY SCREEN

IMAGE FORMATION DEVICE SIMULATION APPARATUS

This application claims priority under 35 USC 119 from Japanese patent document, JP-2006-034960, the disclosure of which is incorporated by reference herein.

BACKGROUND OF THE INVENTION

1. Technical Field

The present invention relates to an image formation device simulation apparatus for performing a simulation of processing performed by an image formation device, an image formation device simulation method and a program product therefor.

2. Related Art

Presently, various models of an image formation device such as a printer or a copying machine are commercially available, and consumable items of kinds or prices different by a type of the image formation device are used. Also, even when the same image is formed, the amount of consumption of the consumable item may vary by the kind of the image formation device. As a result of the above, performing cost at the time of use or a life of the consumable item also varies by the kind of the image formation device. Therefore, in the case of buying an image formation device, a user normally selects the image formation device by, for example, comparing plural image formation devices with respect to cost or a life of the consumable item by examining information released by catalogues previously.

However, the information released by catalogues of the image formation devices only shows information about running cost of the case of being used under a certain condition generally. Also, in the technique of the conventional example, performing cost or the amount of consumption of a consumable item cannot be known unless image formation processing is continued using an image formation device actually. As a result of that, for example, when a user frequently outputs image data of a particular format, the user cannot know the amount of consumption of the consumable item of the image formation device in a use form of the actual user until the image formation device is bought and used.

SUMMARY

According to one aspect of the invention, there is provided an image formation device simulation apparatus for performing a simulation of processing performed by an image formation device. The simulation apparatus includes: an image formation command acquisition unit that acquires an image formation command including information of a target image to be formed by the image formation device; a simulation unit that performs a simulation of image formation processing performed by the image formation device for forming the target image on a recording medium, and generates output image data that corresponds to the target image to be formed on the recording medium, based on the image formation command; and a consumption amount calculation unit that calculates and outputs an amount of consumption of a consumable item that the image formation device predictably consumes by the image formation processing, based on the output image data.

BRIEF DESCRIPTION OF THE DRAWINGS

In the accompanying drawings:

FIG. 5 is a diagram showing one example of a simulation result display screen displayed on the user terminal.

DETAILED DESCRIPTION

Figure 1:
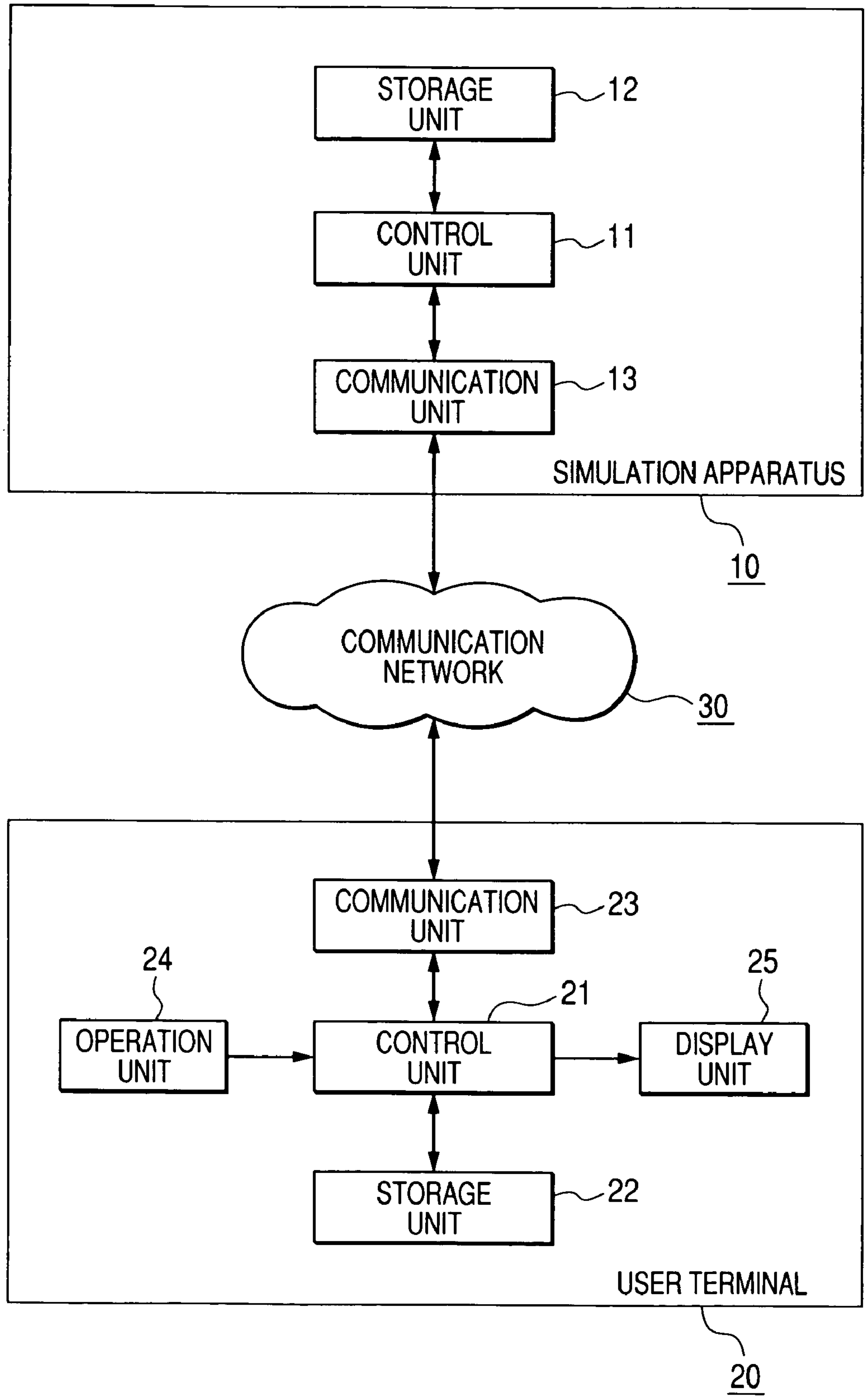
FIG. 1 is a diagram showing a schematic configuration of a computer system including an image formation device simulation apparatus according to an embodiment.

An embodiment will be described below with reference to the drawings. FIG. 1 is a diagram showing a schematic configuration of a computer system including an image formation device simulation apparatus according to one embodiment.

In the embodiment, a simulation apparatus 10 is connected to a user terminal 20 through a communication network 30 so that data communication can be conducted mutually as shown in FIG. 1. The communication network 30 may be a wide area network such as the Internet or may be a LAN (Local Area Network) such as an in-house intranet.

Here, the simulation apparatus 10 is, for example, a general server computer and is configured to include a control unit 11, a storage unit 12 and a communication unit 13. This simulation apparatus 10 corresponds to an image formation device simulation apparatus in the invention. The simulation apparatus 10 performs a simulation of processing performed by an image formation device in response to a processing request sent from the user terminal 20 and outputs a result to the user terminal 20.

As one example, the simulation apparatus 10 functions as a web application server for generating and sending data of a web page to a request from the user terminal 20. That is, the simulation apparatus 10 sends data of a web page generated by arranging information etc. which wants to be presented to a user as a result of a simulation or a user interface for prompting a user to input various information to the user terminal 20 and thereby, performs the simulation to output its result.

The control unit 11 of the simulation apparatus 10 is, for example, a CPU and operates according to a program stored in the storage unit 12. In the embodiment, a simulation of processing performed by the image formation device is run based on a request from the user terminal 20. An example of processing performed by the control unit 11 in the embodiment will be described below in detail.

The storage unit 12 includes a storage medium capable of being read by a computer for holding programs executed by the control unit 11, and is configured to include at least one of a disk device and a memory element such as RAM or ROM. Also, the storage unit 12 operates as work memory of the control unit 11.

In the embodiment, consumable item basic information about a consumable item used by an image formation device targeted for simulation is stored in the storage unit 12. The consumable item basic information is, for example, information about the total amount received in the image formation device, cost, the amount of consumption per unit recording medium or unit pixel, etc. with respect to each of the consumable items used by the image formation device. Also, cost related information about performing cost, for example, information about power consumption of the image formation device may be stored in the storage unit 12. Further, information about the amount of consumption of a consumable item consumed in the case other than image formation processing in response to an image formation request from a user may be stored in the storage unit 12.

As an example, an image formation device targeted for simulation shall comprise image formation section for developing an electrostatic latent image carried on an image carrier (photoconductive drum) using toner of four colors of cyan (C), magenta (M), yellow (Y), black (K) and transferring a developed image on a recording medium such as paper and forming an image. In this case, the image formation device uses the photoconductive drum and four toner cartridges according to each component color as a consumable item. In this example, for example, consumable item basic information or cost related information as shown in the following is stored in the storage unit 12.

(1) A total number of pixels capable of being formed by a toner cartridge of each component color.

(2) Cost per toner cartridge of each component color.

(3) A total number of record media capable of being formed by one photoconductive drum.

(4) Cost necessary to replace a photoconductive drum.

(5) Cost necessary according to power consumption of an image formation device per recording medium.

(6) An amount of consumption of toner of each component color consumed by processing other than image formation processing such as register adjustment per recording medium.

The communication unit 13 is, for example, a network card and sends information through the communication network 30 according to instructions from the control unit 11. Also, the communication unit 13 receives information incoming through the communication network 30 and outputs the information to the control unit 11.

The user terminal 20 is, for example, a personal computer and is configured to include a control unit 21, a storage unit 22, a communication unit 23, an operation unit 24 and a display unit 25. A user can make the simulation apparatus 10 performed a simulation of an image formation device by an instruction operation to the user terminal 20 and can check a result of the simulation by the simulation apparatus 10 by browsing information displayed on the display unit 25 of the user terminal 20.

As one example, when the simulation apparatus 10 serves as a web application server, the user terminal 20 executes a web browser program and makes the display unit 25 display data of a web page outputted by the simulation apparatus 10. As a result of this, a user can input various information necessary to perform a simulation on the web page or can check a result of the simulation displayed on the web page.

The control unit 21 of the user terminal 20 includes, for example, a CPU and operates according to a program stored in the storage unit 22. In the embodiment, a execution request of a simulation to the simulation apparatus 10 is outputted according to an instruction operation to the operation unit 24 of a user. Also, a performing result of a simulation sent from the simulation apparatus 10 is accepted and is displayed on the display unit 25.

The storage unit 22 includes a storage medium capable of being read by a computer for holding programs executed by the control unit 21, and is configured to include at least one of a disk device and a memory element such as RAM or ROM. Also, the storage unit 22 operates as work memory of the control unit 21.

The communication unit 23 includes, for example, a network card and sends information through the communication network 30 according to instructions from the control unit 21. Also, the communication unit 23 receives information incoming through the communication network 30 and outputs the information to the control unit 21.

The operation unit 24 includes, for example, a keyboard or a mouse, and accepts an instruction operation of a user, and outputs the contents of the instruction operation to the control unit 21. The display unit 25 is, for example, a display, and displays information according to instructions from the control unit 21.

Figure 2:
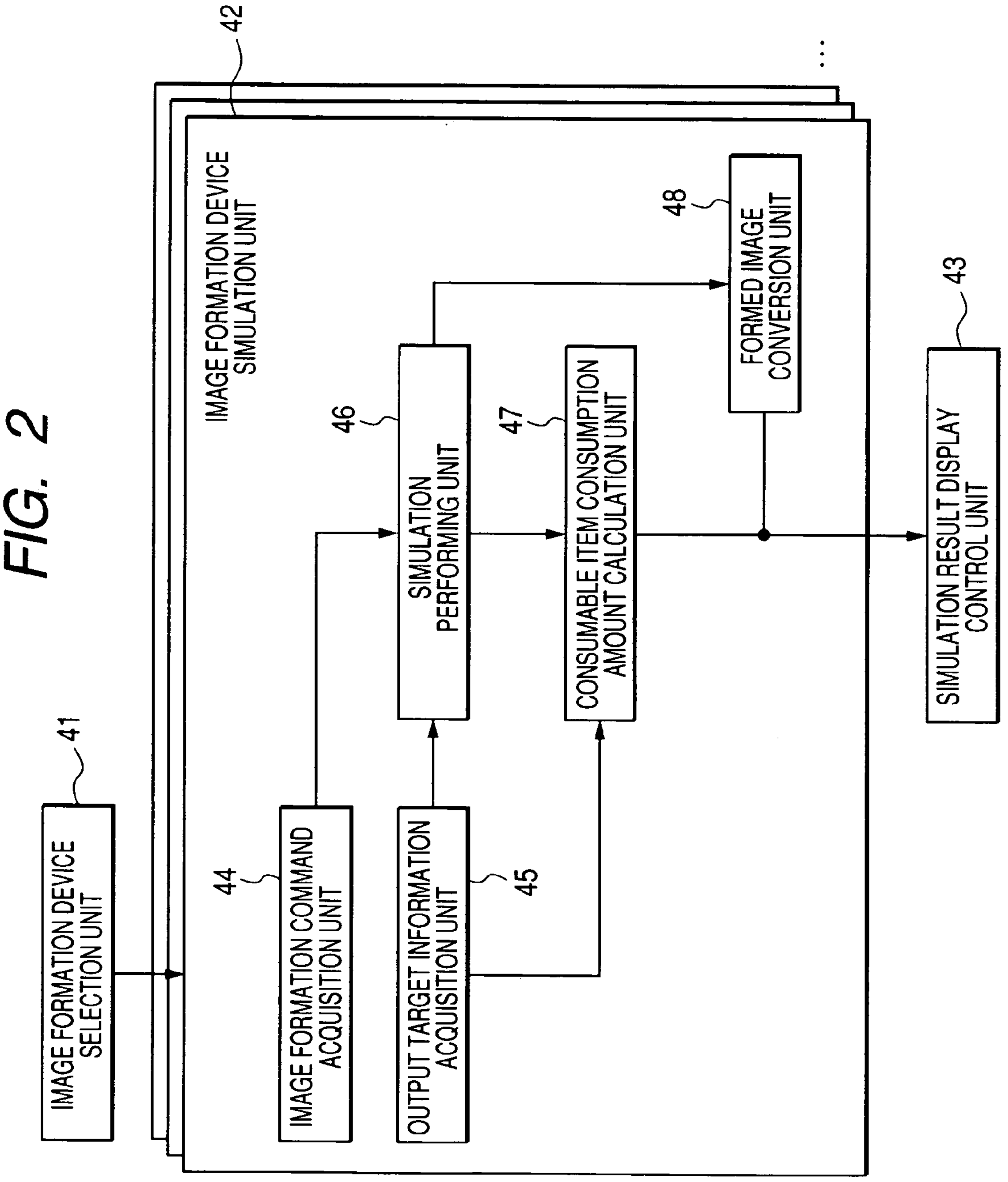
FIG. 2 is a functional block diagram showing a function of the image formation device simulation apparatus according to the embodiment.

Next, a function implemented by the simulation apparatus 10 in the embodiment will be described. The simulation apparatus 10 is configured to functionally include an image formation device selection unit 41, an image formation device simulation unit 42 and a simulation result display control unit 43 as shown in FIG. 2. For example, the control unit 11 executes a program stored in the storage unit 12 and thereby, these functions can be implemented. In addition, when there are plural kinds of image formation devices capable of performing a simulation by the simulation apparatus 10, there may be plural image formation device simulation units 42 with the image formation device simulation units associated with each of the plural kinds of image formation devices.

The image formation device selection unit 41 selects an image formation device targeted for simulation from among plural kinds of image formation devices capable of performing a simulation by the simulation apparatus 10 based on an instruction operation to the operation unit 24 of the user terminal 20 by a user. In addition, when the simulation apparatus 10 copes with only one kind of image formation device, it is unnecessary to dispose the image formation device selection unit 41.

Figure 3:
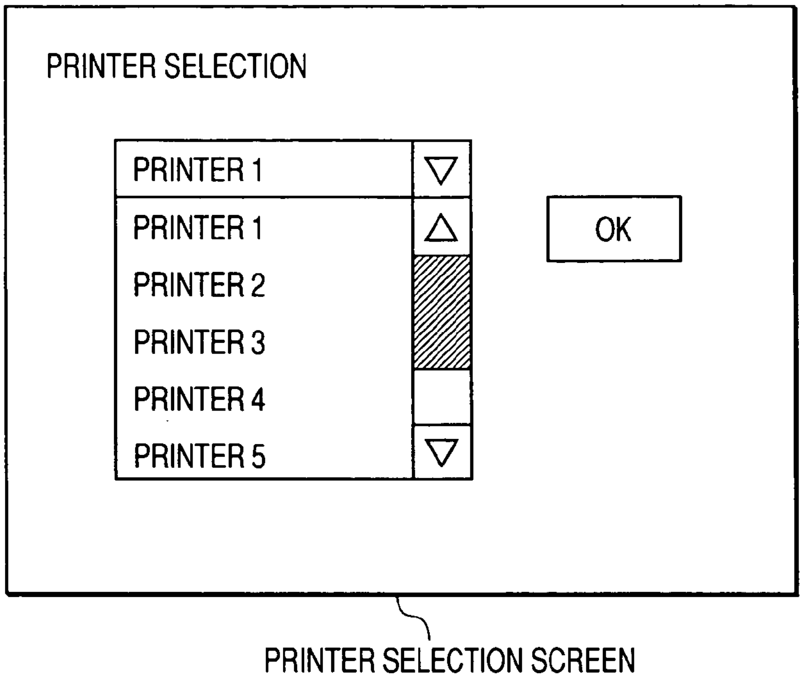
FIG. 3 is a diagram showing one example of a printer selection screen displayed on a user terminal.

As one example, the image formation device selection unit 41 outputs web page data representing a printer selection screen as illustrated in FIG. 3 and displays the screen on the display unit 25 of the user terminal 20. When a user selects an image formation device which wants to perform a simulation by an instruction operation to the operation unit 24 on the screen and depresses a decision button, the user terminal 20 sends information about the selected image formation device to the simulation apparatus 10 through the communication network 30. The image formation device selection unit 41 accepts the information about the selected image formation device and decides the image formation device targeted for simulation.

The image formation device selection unit 41 may select plural image formation devices from among plural kinds of image formation devices capable of selection as a target of simulation according to an instruction operation of a user. In this case, the simulation apparatus 10 performs a simulation with respect to each of the plural image formation devices selected and, for example, may output results of respective simulations in a form in which a user can compare the results.

The image formation device simulation unit 42 performs a simulation of processing performed by an image formation device targeted for simulation. In addition, when there are plural image formation device simulation units 42, as described above, each of the image formation device simulation units 42 is associated with a particular kind of image formation device and performs a simulation of processing performed by the associated image formation device.

Details of a function implemented by the image formation device simulation unit 42 will be described herein. In the following description, an image formation device targeted for simulation by the image formation device simulation unit 42 is set as an image formation device P. The image formation device simulation unit 42 is configured to include an image formation command acquisition unit 44, an output target information acquisition unit 45, a simulation performing unit 46, a consumable item consumption amount calculation unit 47 and a formed image conversion unit 48.

The image formation command acquisition unit 44 acquires an image formation command R including information about a target image targeted for image formation by the image formation device P. The image formation command R is a control command which makes the image formation device P perform image formation and is described by, for example, a PDL (Page Description Language). In addition, the image formation command acquisition unit 44 may acquire plural image formation commands R.

As an example, the image formation command acquisition unit 44 acquires the image formation command R by, for example, a method as illustrated below.

An example in which the user terminal 20 sends an image formation command R generated on the user terminal 20 to the simulation apparatus 10 by an instruction operation to the operation unit 24 of a user and thereby the image formation command acquisition unit 44 acquires the image formation command R will be first described as a first example. In this case, for example, a user obtains a printer driver program for generating the image formation command R by, for example, downloading the printer driver program from a web server etc. (may be the simulation apparatus 10) and installs the printer driver program in the user terminal 20. Next, the user makes the user terminal 20 execute an application program and performs an instruction operation for doing printing together with specification for using the printer driver program. As a result of this, the control unit 21 of the user terminal 20 executes the printer driver program and generates the image formation command R. Further, the user specifies the generated image formation command R and performs an instruction operation for uploading the image formation command R on a web page displayed on the display unit 25. As a result of this, the user terminal 20 sends the image formation command R to the simulation apparatus 10 and the image formation command acquisition unit 44 accepts the sent image formation command R and thereby acquires the image formation command R.

According to this first example, a user generates an image formation command R necessary for simulation and then it is necessary to further perform an instruction operation for uploading the image formation command R, and time and effort are taken. Therefore, the user terminal 20 may send the image formation command R generated on the user terminal 20 to the simulation apparatus 10 as it is. This case will be described below as a second example.

In the second example, in a manner similar to the first example, a user installs a printer driver program in the user terminal 20 and gives print instructions from an application program. The control unit 21 of the user terminal 20 generates an image formation command R by executing the printer driver program and outputs the image formation command R to a virtual printer port. The image formation command R outputted to the virtual printer port is sent to the simulation apparatus 10 through the communication network 30. As a result of this, the image formation command acquisition unit 44 acquires the sent image formation command R.

In both the first and second examples, a user obtains a printer driver program and installs the printer driver program in the user terminal 20. As a result of this, the user can make the simulation apparatus 10 performed a simulation by performing an instruction operation similar to the case of making an image formation device P form an image with respect to the user terminal 20 actually. However, in these examples, it is necessary to newly install a printer driver program in the user terminal 20 for simulation, and time and effort are taken. Therefore, for example, the user terminal 20 may send application data by executing and generating an application program based on an instruction operation of a user to the simulation apparatus 10 as it is and the simulation apparatus 10 may generate an image formation command R. This case will be described below as a third example.

In the third example, a user performs an instruction operation for uploading application data representing an image which wants to be targeted for image formation by an image formation device P on, for example, a web page displayed on the display unit 25. As a result of this, the user terminal 20 sends the application data to the simulation apparatus 10. The control unit 11 of the simulation apparatus 10 accepting the application data performs predetermined processing according to a kind of the application data and generates an image formation command R corresponding to the image formation device P. Here, the control unit 11 determines the kind of the application data based on specification of a user or an extension etc. of the application data sent. As a result of this, the image formation command acquisition unit 44 can acquire the image formation command R without taking time and effort of a user. However, in this third example, the simulation apparatus 10 needs to comprise image formation command generation means for performing predetermined processing according to a kind of application data in which a user wants to perform a simulation and generating an image formation command R based on the application data.

According to the method of the examples described above, the image formation command acquisition unit 44 acquires an image formation command R generated based on application data stored in the user terminal 20. The simulation performing unit 46 performs a simulation based on this image formation command R and thereby, a user can make the simulation apparatus 10 performed a simulation using application data in which the user actually wants to make an image formation device P form an image.

Also, the image formation command acquisition unit 44 may store the acquired image formation command R in the storage unit 12. In this case, the image formation command acquisition unit 44 can acquire the image formation command R which is stored in the storage unit 12 and is used as a target of processing at the time of performing the previous simulation according to instructions of a user when a simulation is performed the next time or later. As a result of this, time and effort of a user can be saved when conditions of operating environment etc. are changed and simulations are performed several times. Or, the image formation command acquisition unit 44 may acquire predetermined sample data previously stored in the storage unit 12 as an image formation command R according to instructions of a user.

Also, in the case of performing simulations with respect to plural image formation devices, when a data format of an image formation command R is the same in the plural image formation devices, the image formation command R acquired by the image formation command acquisition unit 44 included in the image formation device simulation unit 42 associated with the particular image formation device may be acquired by the image formation command acquisition unit 44 included in another image formation device simulation unit 42 and be used in simulation. As a result of this, a user performs an instruction operation for sending one image formation command R to the simulation apparatus 10 and thereby, simulations of the case of sending the image formation command R common to plural image formation devices can be performed respectively.

The output target information acquisition unit 45 acquires information about a target outputted as a performing result of simulation based on specification of a user. Concretely, the output target information acquisition unit 45 acquires, for example, information for specifying formed image data, performing cost of an image formation device P or a life of each consumable item used by the image formation device P as output target information.

Figure 4:
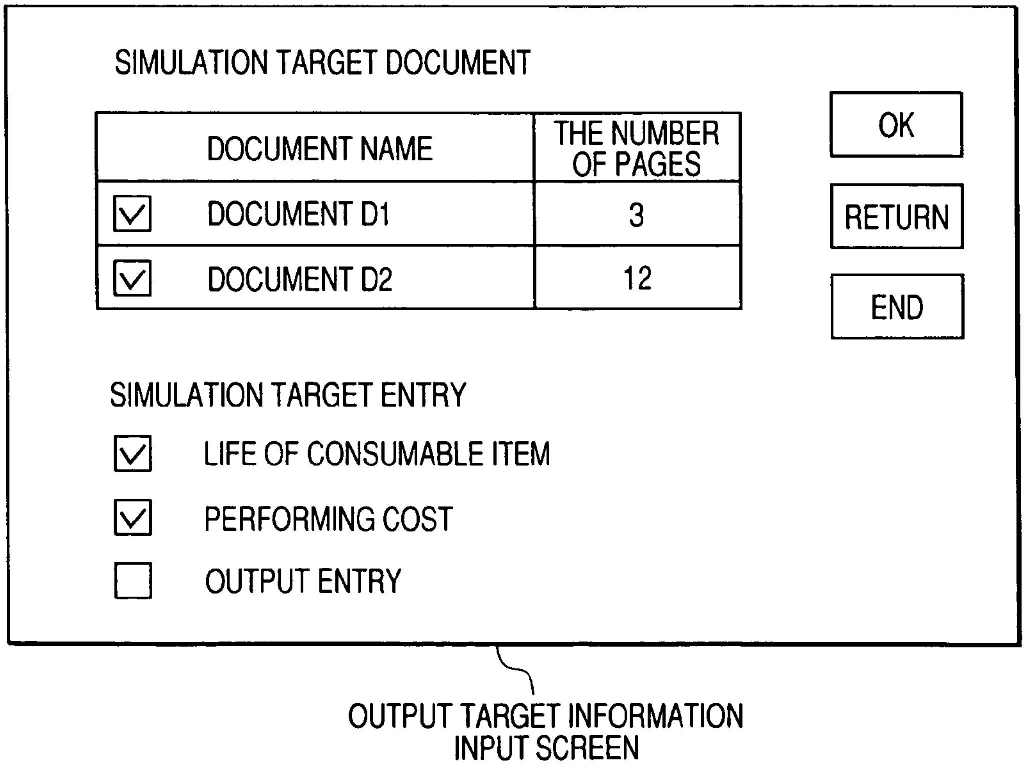
FIG. 4 is a diagram showing one example of an output target information input screen displayed on the user terminal.

As one example, the output target information acquisition unit 45 generates and outputs web page data representing an output target information input screen as illustrated in FIG. 4 and thereby displays the web page data on the display unit 25 of the user terminal 20. In an example of FIG. 4, information (a document name and the number of pages) about an image formation command R acquired by the image formation command acquisition unit 44 as a simulation target is also displayed. Here, a user selects a simulation target entry which wants to be outputted as a simulation result and an image formation command R targeted for simulation by an instruction operation to the operation unit 24. The user terminal 20 sends information representing the selected image formation command R and the simulation target entry to the simulation apparatus 10. The output target information acquisition unit 45 acquires output target information by accepting the information sent by the user terminal 20.

The simulation performing unit 46 performs a simulation (image formation simulation processing) of image formation processing in which an image formation device P forms a target image included in an image formation command R on a recording medium based on the image formation command R acquired by the image formation command acquisition unit 44. Then, the image formation device P generates output image data formed on the recording medium according to the image formation command R by performing the image formation simulation processing.

Image formation processing performed by the image formation device P targeted for simulation by the simulation performing unit 46 will be described herein. The image formation processing is processing in which the image formation device P forms the target image included in the image formation command R on the recording medium. As an example, the image formation device P makes a data analysis of each of one or plural target images included in the image formation command R based on the image formation command R and generates output image data according to each of the target images. For example, when the image formation device P comprises image formation section for forming an image on the recording medium using toner of four colors of CMYK, output image data is image data represented by four component colors of CMYK. The image formation device P generates the output image data by performing color conversion processing etc. in consideration of tone characteristics of the image formation section with respect to image data of the target image. Then, by sequentially outputting the output image data to the image formation section, the image formation section is made to execute image formation represented by the output image data. As a result of this, the image formation device P can form an image according to the target image on the recording medium.

The simulation performing unit 46 generates the output image data outputted by the image formation device P based on the image formation command R by performing a simulation of this image formation processing.

Also, when information for specifying formed image data is included in output target information acquired by the output target information acquisition unit 45, the simulation performing unit 46 may generate the formed image data representing a formed image formed on a recording medium based on the generated output image data. For example, based on information about size of the recording medium used or margin setting included in the image formation command R, formed image data representing a formed image in which an image represented by output image data is formed on a recording medium is generated.

The consumable item consumption amount calculation unit 47 calculates the amount of consumption of a consumable item which the image formation device P predictably consumes by the image formation processing described above based on output image data generated by the simulation performing unit 46, and outputs the amount of consumption to the simulation result display control unit 43. In addition, in the following description, the output image data generated by the simulation performing unit 46 is set as output image data.

As an example, the consumable item consumption amount calculation unit 47 counts the number of pixels of a component color included in the output image data with respect to each of the component colors which the image formation device P uses in image formation, and calculates the amount of consumption of a consumable item based on the number of pixels counted. For example, when the image formation device P forms an image using toner of four colors of CMYK, the output image data is generally formed of a binary image for each of CMYK. Therefore, the consumable item consumption amount calculation unit 47 obtains the number of pixels PixC, PixM, PixY and PixK of each of CMYK by counting the number of effective pixels with respect to each of the binary images. Then, the amount of consumption of the consumable item is calculated based on this number of pixels.

For example, in the case of calculating the amount of consumption of a toner cartridge of cyan as a consumable item, the consumable item consumption amount calculation unit 47 calculates a rate (toner consumption amount rate) ConsC of the amount of toner consumption to the total amount of the toner cartridge as the amount of consumption of the consumable item by the following computation formula.

$$\mathrm{Cons}C=\mathrm{Pix}C/\mathrm{TotalPix}C$$

In the formula above, TotalPixC is a value representing the total number of pixels capable of being formed by the toner cartridge of cyan, and shall be previously stored in the storage unit 12 as consumable item basic information about the image formation device P. Also, toner consumption amount rates ConsM, ConsY and ConsK of each of the component colors of magenta, yellow and black can be calculated similarly.

The consumable item consumption amount calculation unit 47 may add the amount of consumption of a consumable item consumed by processing other than the image formation processing to the amount of consumption calculated. For example, an image formation device generally forms an image for register adjustment on a photoconductive drum and detects its position by a sensor etc. and thereby makes register adjustment (adjustment of an image formation position). By this register adjustment, a consumable item such as toner is consumed though image formation on a recording medium is not performed. Therefore, the simulation apparatus 10 stores the amount of toner consumption of each of the component colors used by the register adjustment per recording medium previously calculated based on the amount of toner consumption per register adjustment and average implementation frequency of register adjustment in the storage unit 12. Then, the consumable item consumption amount calculation unit 47 adds a value of the amount of toner consumption consumed by the register adjustment to the amount of toner consumption consumed by the image formation processing calculated based on the number of pixels etc. As a result of this, the consumable item consumption amount calculation unit 47 can calculate the amount of consumption in consideration of the amount of consumption of a consumable item consumed by processing other than the image formation processing.

Also, when information for specifying performing cost or a life of a consumable item is included in output target information acquired by the output target information acquisition unit 45, the consumable item consumption amount calculation unit 47 may further calculate performing cost or a life of a consumable item of the case of using an image formation device P based on the amount of consumption of the consumable item calculated and output the performing cost or the life to the simulation result display control unit 43.

As an example, the consumable item consumption amount calculation unit 47 can calculate the number (the number of formable sheets) of record media capable of being formed by one toner cartridge of each of the component colors as a life of the toner cartridge by calculating the reciprocal of the toner consumption amount rate described above. For example, the number VolC of formable sheets of a toner cartridge of cyan can be calculated by the following computation formula.

$$VolC = TotalPixC/PixC$$

Also, the consumable item consumption amount calculation unit 47 can calculate performing cost per recording medium with respect to a toner cartridge of each of the component colors by multiplying the toner consumption amount rate described above by cost (price) per toner cartridge. For example, performing cost CostC of a toner cartridge of cyan can be calculated by the following computation formula.

$$CostC = ConsC \times PriceC$$

In the above formula, PriceC is the price per toner cartridge of cyan, and shall be previously stored in the storage unit 12 as consumable item basic information about the image formation device P. Also, the consumable item consumption amount calculation unit 47 can calculate performing cost per recording medium with respect to a photoconductive drum based on the total number of record media capable of being formed by one photoconductive drum and information about cost necessary to replace the photoconductive drum read out of the storage unit 12.

The consumable item consumption amount calculation unit 47 can calculate performing cost per recording medium of the whole image formation device P by adding the performing cost per recording medium of each of the consumable items calculated. Here, the consumable item consumption amount calculation unit 47 may acquire performing cost of an item other than a consumable item based on cost related information stored in the storage unit 12 and add the performing cost to the performing cost calculated. For example, the consumable item consumption amount calculation unit 47 acquires cost necessary according to power consumption of the image formation device P per recording medium and adds the cost to the performing cost of the consumable item calculated. As a result of this, performing cost of the image formation device P in consideration of the power consumption can be calculated.

In the above description, the performing cost, the life or the amount of consumption of a consumable item has been calculated using image formation processing for forming one target image on one recording medium as a unit, but the consumable item consumption amount calculation unit 47 may calculate the amount of consumption etc. of a consumable item every document. For example, when information about plural target images is included in one image formation command R acquired by the image formation command acquisition unit 44, it is considered that one document is constructed by plural target images included in this one image formation command. The consumable item consumption amount calculation unit 47 calculates the amount of consumption etc. of a consumable item consumed in the case of forming this one document. Concretely, the consumable item consumption amount calculation unit 47 obtains the sum of pixels SumPixC, SumPixM, SumPixY and SumPixK of each of CMYK by counting the number of pixels of each of the component colors with respect to all the plural output image data generated from the plural target images. By performing computation similar to that of the case of PixC, PixM, PixY and PixK described above using the sum of pixels, the consumable item consumption amount calculation unit 47 can calculate performing cost, a life or the amount of consumption of a consumable item using a document as a unit. Also, performing cost of a storage medium unit averaged by the whole document may be calculated by dividing performing cost calculated using a document as a unit by the number of target images included in the document.

Further, the consumable item consumption amount calculation unit 47 may calculate the amount of consumption etc. of a consumable item in the case of performing image formation processing with respect to plural kinds of documents. A user normally makes an image formation device P execute image formation of various kinds of documents. As a result of that, there is a possibility that performing cost etc. of the case of actually using the image formation device P cannot be estimated correctly even when a simulation is performed using only one kind of document. Therefore, for example, the consumable item consumption amount calculation unit 47 calculates performing cost, a life or the amount of consumption of a consumable item with respect to each of the plural kinds of documents, and calculates the weighted average. As a result of this, a user can know the performing cost etc. of the case of forming images of plural kinds of documents at a predetermined ratio.

For example, when the image formation command acquisition unit 44 acquires two image formation commands R, the consumable item consumption amount calculation unit 47 calculates the amount of consumption of a consumable item with respect to each of the documents based on output image data of documents D1 and D2 included in the two image formation commands R. On the other hand, the consumable item consumption amount calculation unit 47 acquires a ratio at which each of the documents D1 and D2 is outputted to an image formation device P based on specification of a user. For example, when a user specifies that the document D1 is outputted at a ratio of 60% and the document D2 is outputted at a ratio of 40%, the consumable item consumption amount calculation unit 47 calculates the weighted average of the amount of consumption calculated with respect to each of the documents based on this acquired ratio. As a result of this, for example, the average amount of consumption of the consumable item in the case where the user outputs the document D1 at the ratio of 60% and outputs the document D2 at the ratio of 40% can be calculated.

In addition, even when the image formation device P uses a consumable item other than the consumable item described above, the consumable item consumption amount calculation unit 47 can calculate performing cost, a life or the amount of consumption of the consumable item in like manner. That is, the performing cost, the life or the amount of consumption of the consumable item can be calculated based on the number of target images included in the image formation command R or the number of pixels of each of the component colors included in the output image data generated based on each of the target images and information about cost or the amount of consumption per unit recording medium or cost or the amount of consumption per unit pixel of each of the consumable items previously stored by the simulation apparatus 10.

The formed image conversion unit 48 converts formed image data generated by the simulation performing unit 46 into image data of a predetermined data format such as a bitmap format capable of being displayed on the display unit 25 of the user terminal 20, and outputs the formed image data to the simulation result display control unit 43. In addition, when display of a simulation result representing a formed image formed by the image formation device P is not required, it is unnecessary to dispose the formed image conversion unit 48.

The simulation result display control unit 43 performs display control processing for performing display on the display unit 25 of the user terminal 20 by outputting data outputted as a result of simulation by the image formation device simulation unit 42 as, for example, web page data with respect to an image formation device selected by the image formation device selection unit 41. Data targeted for the display control processing includes a life or the amount of consumption of a consumable item calculated by the consumable item consumption amount calculation unit 47 and also performing cost etc. of the image formation device P. Also, the formed image data etc. converted by the formed image conversion unit 48 may be included in the data targeted for the display control processing by the simulation result display control unit 43.

As a result of this, a user can check a performing result of simulation by browsing the contents displayed on the display unit 25 of the user terminal 20. As one example, by outputting web page data representing a simulation result display screen as illustrated in FIG. 5, the simulation result display control unit 43 displays the screen on the display unit 25 of the user terminal 20. In an example of FIG. 5, information about performing cost of an image formation device P, a life and the amount of consumption of a consumable item in the case where the image formation device P forms the whole document included in an image formation command R is displayed on the upper portion of the simulation result display screen. Also, similar information about the consumable item in the case of forming one target image included in the image formation command R is displayed on the lower portion of the simulation result display screen. The simulation result display control unit 43 switches the contents of the lower portion of the simulation result display screen so as to display information calculated with respect to each of the plural target images according to an instruction operation of a user.

Also, the simulation result display control unit 43 may display each of the simulation results on the display unit 25 of the user terminal 20 so that each of the simulation results can be compared when the image formation device selection unit 41 selects plural image formation devices and the image formation device simulation unit 42 performs simulations with respect to each of the plural image formation devices.

Figure 6:
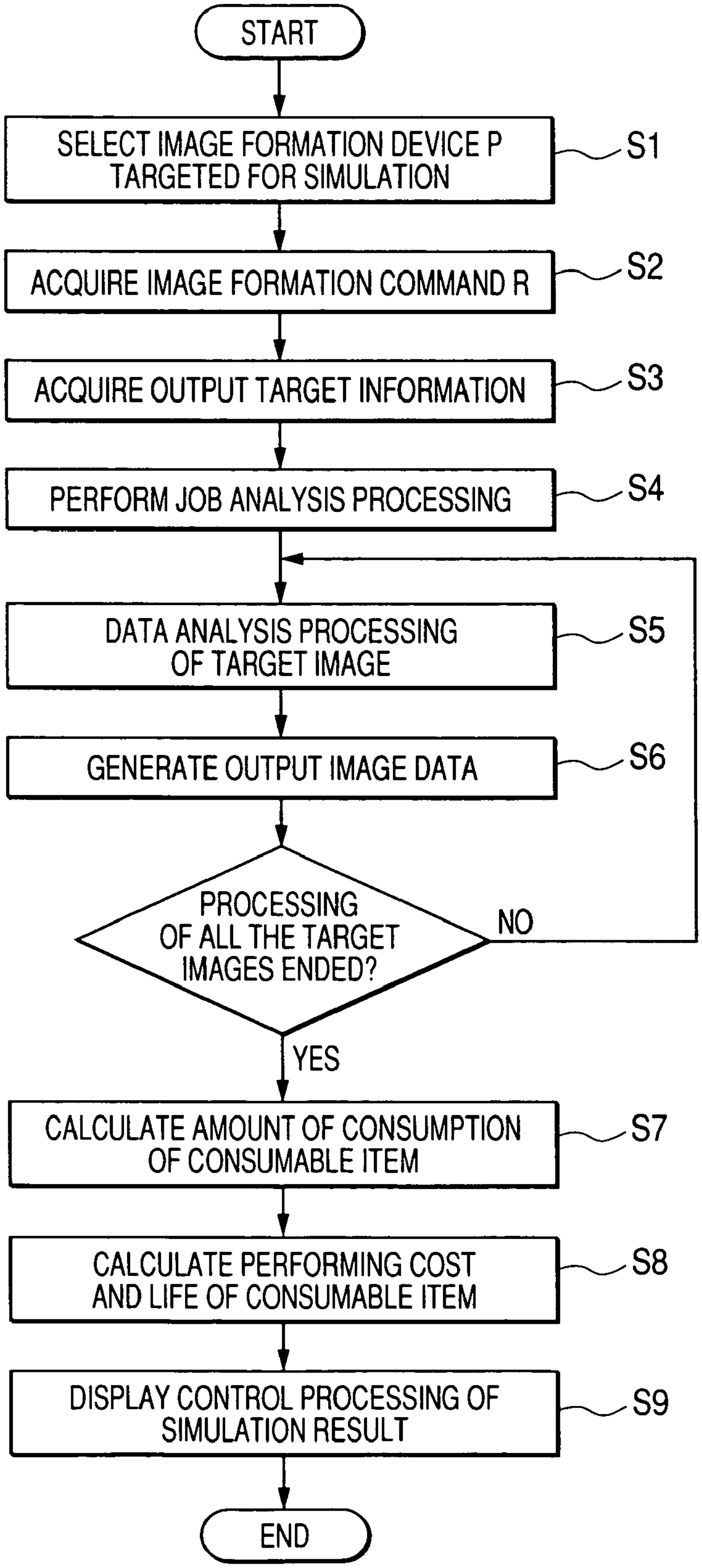
FIG. 6 is a flowchart showing one example of processing performed by the image formation device simulation apparatus according to the embodiment.

Next, an example of a flow of the whole processing in which the simulation apparatus 10 performs a simulation in the embodiment will be described based on a flowchart of FIG. 6.

First, the image formation device selection unit 41 selects an image formation device P targeted for simulation based on specification of a user (S1). Subsequently, the image formation command acquisition unit 44 acquires an image formation command R (S2).

Next, a user specifies information which wants to be used as a target which the simulation apparatus 10 is made to output as a result of simulation by an instruction operation to the operation unit 24. As a result of this, the output target information acquisition unit 45 acquires output target information (S3). Here, information for specifying performing cost and a life of a consumable item shall be acquired as the output target information.

As a result of this, the simulation performing unit 46 starts a simulation of image formation processing performed by the image formation device P. Also, the simulation performing unit 46 may start a run of simulation by an instruction operation for instructing a simulation start of a user after the processing of S3.

The simulation performing unit 46 first performs job analysis processing with respect to the portion described by a job control language included in the image formation command R (S4).

Subsequently, the simulation performing unit 46 performs the following processing with respect to each of the target images included in the image formation command R. That is, the simulation performing unit 46 first performs data analysis processing based on information about the target image targeted for processing included in the image formation command R (S5). Next, based on an analysis result by the processing of S5, image drawing processing is performed and output image data is generated (S6). The simulation performing unit 46 repeatedly performs the processing of S5 and S6 with respect to all the target images targeted for image formation included in the image formation command R acquired.

Then, the consumable item consumption amount calculation unit 47 calculates the amount of consumption of a consumable item based on the output image data generated by the processing of S6 (S7). Subsequently, performing cost and a life of the consumable item are calculated based on the amount of consumption calculated by the processing of S7 (S8).

The simulation result display control unit 43 performs display control processing for displaying a result of simulation on the display unit 25 of the user terminal 20 (S9). As an example, the simulation result display control unit 43 displays the amount of consumption of the consumable item obtained as a result of the processing of S7 and the performing cost and the life of the consumable item obtained as a result of the processing of S8 on the display unit 25.

In addition, in the flow described above, calculation of the amount of consumption of the consumable item is started after all the output image data are generated based on all the target images included in the image formation command R, but order of the processing is not limited to such order. For example, when information about plural target images is included in the image formation command R, in parallel with processing for generating output image data, the consumable item consumption amount calculation unit 47 may sequentially count the number of pixels of each of the component colors included in the generated output image data and calculate the amount of consumption.

According to the embodiment described above, by performing a simulation of image formation based on an image formation command including information about a target image, even in a state in which there is no image formation device, the amount of consumption of a consumable item consumed by image formation processing can be predicted and performing cost of an image formation device or a life of the consumable item at the time of actual use of a user can be calculated. Also, cost according to an actual use form of a user can be estimated by performing a simulation using an image formation command is generated based on application data thinking that the user actually wants to form an image.

In addition, the invention is not limited to the embodiment described above, and can be implemented by various embodiments. For example, in the above description, a user has checked a result of simulation or has performed an instruction operation with respect to the user terminal 20 different from the simulation apparatus 10, but a function performed by the simulation apparatus 10 and a function performed by the user terminal 20 may be implemented on one computer. Or, the function performed by the simulation apparatus 10 may be implemented by cooperation of plural computers. For example, the image formation device simulation apparatus according to one embodiment may comprise a front end server for performing reception of information sent from the user terminal 20 and an output of a web page displayed on the user terminal 20, and a back end server for performing a simulation of processing performed by an image formation device P.

The simulation apparatus 10 may acquire, for example, information about software of setting information etc. about operating conditions or information about a hardware configuration of an expanded option etc. of the image formation device P based on an instruction operation etc. to the operation unit 24 of a user as initial information. The simulation performing unit 46 performs image formation simulation processing based on the acquired initial information and thereby, the simulation apparatus 10 can perform a simulation closer to image formation processing actually performed by the image formation device P.

When the user terminal 20 sends an image formation command or application data, etc. to the simulation apparatus 10, the image formation command or application data may be encrypted by a predetermined method and be sent. In this case, the image formation command acquisition unit 44 acquires an image formation command by decoding the data received. As a result of this, the risk of leakage of information about user data on the communication network 30 can be reduced and the user can make the simulation apparatus 10 performed a simulation using an image including secret information. Further, the user terminal 20 may compress the image formation command or application data, etc. and send them to the simulation apparatus 10. In this case, the image formation command acquisition unit 44 acquires an image formation command by expanding the data received. As a result of this, the amount of data flowing on the communication network 30 can be reduced.

Although the present invention has been shown and described with reference to specific embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An image formation device simulation apparatus for performing a simulation of processing performed by an image formation device, the simulation apparatus comprising:

an image formation command acquisition unit that acquires an image formation command including information of a target image to be formed by the image formation device;

a simulation unit that performs a simulation of image formation processing performed by the image formation device for forming the target image on a recording medium, and generates output image data that corresponds to the target image to be formed on the recording medium, based on the image formation command; and a consumption amount calculation unit that calculates and outputs an amount of consumption of a consumable item that the image formation device predictably consumes by the image formation processing, based on the output image data.

2. The simulation apparatus according to claim 1, wherein the consumption amount calculation unit counts a number of pixels of a component color included in the output image data with respect to each of the component colors the image formation device uses in the image formation processing, and calculates the amount of consumption based on the number of pixels counted.

3. The image formation device simulation apparatus according to claim 1, further comprising a life calculation unit that calculates a life of the consumable item of a case of using the image formation device based on the amount of consumption, and outputs information indicating the life of the consumable item.

4. The image formation device simulation apparatus according to claim 1, further comprising a performing cost calculation unit that calculates a performing cost of a case of using the image formation device based on the amount of consumption calculated, and outputs information indicating the performing cost.

5. The image formation device simulation apparatus according to claim 1, wherein the image formation device simulation apparatus is connected to a user terminal that displays data regarding the amount of consumption outputted by the image formation device simulation apparatus.

6. The image formation device simulation apparatus according to claim 5, wherein the image formation device simulation apparatus is connected to the user terminal via a communication network.

7. A computer system, comprising:

the image formation device simulation apparatus according to claim 1;

a user terminal that displays data regarding the amount of consumption outputted by the image formation device simulation apparatus; and a communication network that connects the image formation device simulation apparatus to the user terminal.

8. A method for performing a simulation of processing performed by an image formation device, the method comprising:

acquiring an image formation command including information of a target image to be formed by the image formation device;

generating output image data that corresponds to the target image to be formed on the recording medium, based on the image formation command, by performing a simulation of image formation processing performed by the image formation device for forming the target image on a recording medium; and calculating and outputting an amount of consumption of a consumable item that the image formation device predictably consumes by the image formation processing, based on the output image data;

wherein the acquiring, generating, calculating, and outputting, is performed by an image formation device simulation apparatus.

9. The method according to claim 8, further comprising:

displaying, by a user terminal connected to the image formation device simulation apparatus, data regarding the amount of consumption outputted by the image formation device simulation apparatus.

10. The method according to claim 9, wherein the image formation device simulation apparatus is connected to the user terminal via a communication network.

11. A computer readable medium storing a program causing a computer to execute a process for performing a simulation of processing performed by an image formation device, the process comprising:

acquiring an image formation command including information of a target image to be formed by the image formation device;

generating output image data that corresponds to the target image to be formed on the recording medium, based on the image formation command, by performing a simulation of image formation processing performed by the image formation device for forming the target image on a recording medium; and calculating and outputting an amount of consumption of a consumable item that the image formation device predictably consumes by the image formation processing, based on the output image data;

wherein the acquiring, generating, calculating, and outputting, is performed by an image formation device simulation apparatus.

* * * * *